(12) United States Patent
Nagatani et al.

(10) Patent No.: US 11,021,028 B2
(45) Date of Patent: Jun. 1, 2021

(54) ARM COMPONENT AND MANUFACTURING METHOD THEREFOR

(71) Applicant: TOYOTA JIDOSHA KABUSHIKI KAISHA, Toyota (JP)

(72) Inventors: Takaaki Nagatani, Okazaki (JP); Katsuhiko Kojima, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/240,823

(22) Filed: Jan. 7, 2019

(65) Prior Publication Data

US 2019/0248198 A1    Aug. 15, 2019

(30) Foreign Application Priority Data

Feb. 9, 2018    (JP) .............................. JP2018-021804

(51) Int. Cl.
*B33Y 10/00* (2015.01)
*B60G 7/00* (2006.01)
*B33Y 80/00* (2015.01)

(52) U.S. Cl.
CPC .............. *B60G 7/001* (2013.01); *B33Y 10/00* (2014.12); *B33Y 80/00* (2014.12); *B60G 2206/012* (2013.01); *B60G 2206/11* (2013.01); *B60G 2206/121* (2013.01); *B60G 2206/8101* (2013.01)

(58) Field of Classification Search
CPC .............. B60G 7/001; B60G 2206/012; B60G 2206/11; B60G 2206/121; B60G 2206/8101; B33Y 10/00; B33Y 80/00
USPC .................................................. 280/124.134
See application file for complete search history.

(56) References Cited

U.S. PATENT DOCUMENTS

| 1,898,100 A | * | 2/1933 | Skillman | ................ | B21D 53/84 |
| | | | | | 74/588 |
| 6,298,962 B1 | * | 10/2001 | Kato | ...................... | B60G 7/001 |
| | | | | | 188/371 |
| 9,909,613 B2 | * | 3/2018 | Cowles, Jr. | ............... | F16C 7/02 |
| 10,589,588 B2 | * | 3/2020 | Souschek | .............. | B60G 7/001 |
| 2002/0098033 A1 | * | 7/2002 | Cardoso | .................... | F16C 7/02 |
| | | | | | 403/56 |

(Continued)

FOREIGN PATENT DOCUMENTS

DE    20 2017 100 165 U1    4/2017
EP         2 270 334 A1       1/2011

(Continued)

OTHER PUBLICATIONS

Translation of JP 2003034112 A obtained from espacenet on Apr. 9, 2020. (Year: 2003).*

*Primary Examiner* — James A Shriver, II
*Assistant Examiner* — Hilary L Johns
(74) *Attorney, Agent, or Firm* — Oblon, McClelland, Maier & Neustadt, L.L.P.

(57) ABSTRACT

At least one underfill part is formed so that a central axis of the arm component coincides with a load line of the arm component. The central axis of the configuration is a line connecting centroids of cross-sectional shapes with one another in an axial direction of the arm component, the cross-sectional shapes being shapes on cross-sectional planes perpendicular to an axis of the arm component. The load line of the arm component is a line on which a load is imposed in the arm component.

3 Claims, 9 Drawing Sheets

(56) References Cited

U.S. PATENT DOCUMENTS

| | | | | |
|---|---|---|---|---|
| 2003/0122339 A1* | 7/2003 | Drabon | ............ | B60G 7/001 |
| | | | | 280/124.134 |
| 2005/0281610 A1* | 12/2005 | MacLean | ............ | F16C 7/026 |
| | | | | 403/56 |
| 2008/0235946 A1* | 10/2008 | Ide | ............ | B23K 20/124 |
| | | | | 29/888.09 |
| 2009/0305077 A1* | 12/2009 | Mizuguchi | ............ | B23K 20/12 |
| | | | | 428/654 |
| 2012/0001397 A1* | 1/2012 | McLaughlin | ............ | B23K 20/12 |
| | | | | 280/124.1 |
| 2015/0097350 A1* | 4/2015 | Shirakami | ............ | B21D 53/84 |
| | | | | 280/124.134 |
| 2015/0292549 A1* | 10/2015 | Cowles, Jr. | ............ | F16C 7/02 |
| | | | | 74/581 |
| 2018/0154720 A1* | 6/2018 | Souschek | ............ | B60G 7/008 |
| 2018/0354328 A1* | 12/2018 | Tatsumi | ............ | B60G 7/001 |

FOREIGN PATENT DOCUMENTS

| | | | |
|---|---|---|---|
| JP | 2003-34112 A | 2/2003 | |
| JP | 2003034112 A * | 2/2003 | ............ B60G 7/001 |
| JP | 2013-32158 | 2/2013 | |
| JP | 2015-47996 | 3/2015 | |
| JP | 2017-105296 | 6/2017 | |
| WO | WO 2017/099212 A1 | 6/2017 | |

\* cited by examiner

US 11,021,028 B2

ARM COMPONENT AND MANUFACTURING METHOD THEREFOR

CROSS REFERENCE TO RELATED APPLICATIONS

This application is based upon and claims the benefit of priority from Japanese patent application No. 2018-021804, filed on Feb. 9, 2018, the disclosure of which is incorporated herein in its entirety by reference.

BACKGROUND

The present disclosure relates to a rod-shaped arm component and its manufacturing method.

A suspension arm including a rod-shaped arm part and cylindrical collar parts formed at ends of the arm part has been known (see Japanese Unexamined Patent Application Publication No. 2013-032158). A slit is formed in the arm part to reduce its torsional rigidity.

The present inventors have found the following problem. In the aforementioned suspension arm, a stress is concentrated on the slit formed in the arm part. Therefore, durability of the suspension arm could be impaired. Accordingly, there is a need for an arm component capable of reducing the torsional rigidity and sustaining the durability at the same time.

SUMMARY

The present disclosure has been made in order to solve the above-described problem and a main object thereof is to provide an arm component capable of reducing its torsional rigidity and sustaining its durability at the same time, and its manufacturing method.

A first exemplary aspect to achieve the above-described object is a rod-shaped arm component, in which at least one underfill part is formed so that a central axis of the arm component coincides with a load line of the arm component, the central axis of the arm component being a line connecting centroids of cross-sectional shapes with one another in an axial direction of the arm component, the cross-sectional shapes being shapes on cross-sectional planes perpendicular to an axis of the arm component, the load line of the arm component indicating a line on which a load is imposed in the arm component.

In this aspect, the underfill part may be formed in the arm component so that torsional rigidity of the arm component has a predetermined value and the central axis of the arm component coincides with the load line of the arm component.

In this aspect, a cylindrical collar part may be integrally formed at an end of the arm component. A hollow part with a hollow formed inside thereof may be formed along the axial direction of the arm component at the end of the arm component. A communicating hole communicating between a space inside the collar part and the hollow part may be formed in a connecting part of the collar part, the connecting part of the collar part connecting with the end of the arm component. Further, the communicating hole may be formed so as to be centered on the central axis of the arm component.

In this aspect, the underfill part may be formed so that the cross-sectional shape of the arm component becomes an X-shape.

Another exemplary aspect to achieve the above-described object may be a method for manufacturing a rod-shaped arm component, in which at least one underfill part is formed in the arm component so that a central axis of the arm component coincides with a load line of the arm component, the central axis of the arm component being a line connecting centroids of cross-sectional shapes with one another in an axial direction of the arm component, the cross-sectional shapes being shapes on cross-sectional planes perpendicular to an axis of the arm component, the load line of the arm component indicating a line on which a load is imposed in the arm component.

In this aspect, the arm component may be integrally formed by a 3D (three-dimensional) printer.

According to the present disclosure, it is possible to provide an arm component capable of reducing its torsional rigidity and sustaining its durability at the same time, and its manufacturing method.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
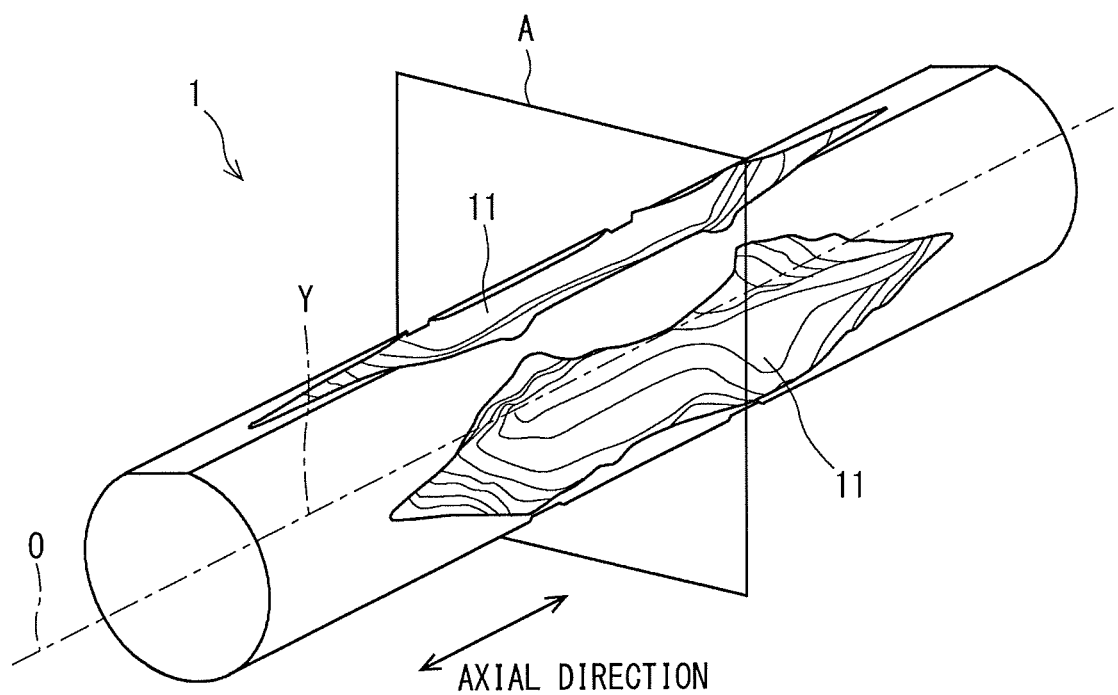
FIG. 1 is a perspective view showing a schematic configuration of an arm component according to a first embodiment of the present disclosure.
Figure 2:
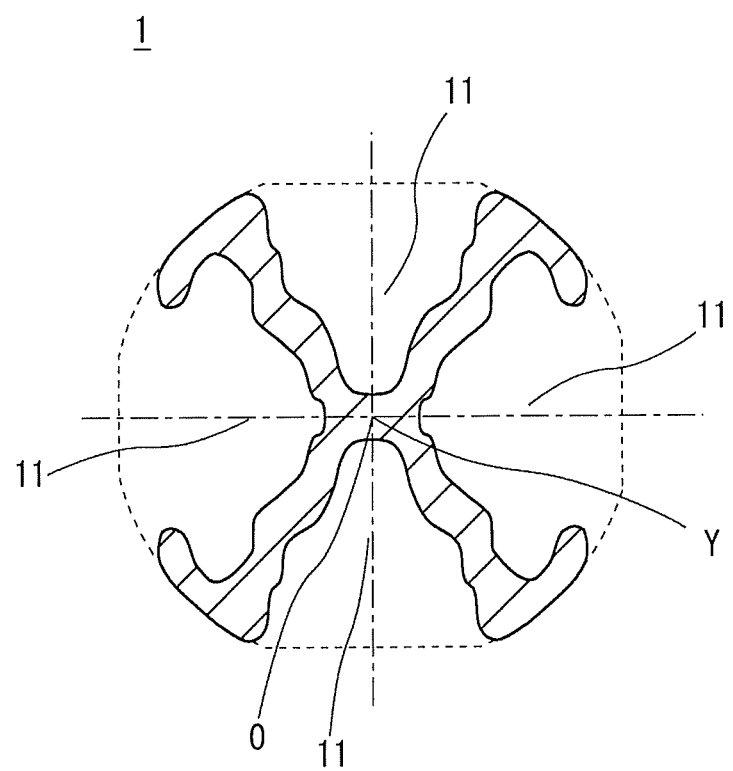
FIG. 2 is a cross section taken on a plane A in the arm component shown in FIG. 1.

Embodiments according to the present disclosure will be described hereinafter with reference to the drawings. FIG. 1 is a perspective view showing a schematic configuration of an arm component according to a first embodiment of the present disclosure. FIG. 2 is a cross section taken on a plane A in the arm component shown in FIG. 1.

An arm component 1 according to the first embodiment is, for example, a rod-shaped suspension arm (e.g., an I-arm). Although the arm component 1 is formed in a roughly cylindrical shape, the shape of the arm component 1 is not limited to the cylindrical shape. For example, the arm component 1 may be formed in a polygonal prism shape. Although the arm component 1 has a solid structure, it is not limited to the solid structure. For example, the arm component 1 may have a hollow structure. The arm component 1 is integrally molded by using, for example, a 3D (three-dimensional) printer.

The suspension arm is, for example, a component used in a suspension system of an automobile or the like, and is a component extremely important for steering stability and riding comfort. Therefore, it is necessary to appropriately reduce torsional rigidity of the suspension arm so that a torsional deformation occurs in a flexible and satisfactory manner even when a torsional load is imposed on the suspension arm while ensuring a predetermined tensile strength and a compressive strength.

In a related-art suspension arm, for example, a slit is formed and hence a stress is concentrated on this slit. As a result, durability of the suspension arm may be impaired. Therefore, there is a need for an arm component capable of reducing the torsional rigidity and sustaining the durability at the same time.

To that end, in the first embodiment, at least one underfill part 11 is formed in the arm component 1 so that a central axis O of the arm component 1 coincides with (i.e., aligns with) a load line Y of the arm component 1. The central axis O of the arm component 1 is a line that connects centroids (centers of gravity) of cross-sectional shapes, which are shapes on cross-sectional planes perpendicular to the axis of the arm component 1, with one another in the axial direction of the arm component 1.

The load line Y of the arm component 1 is a line on which a load is imposed in the arm component 1, i.e., a line that a force passes through when a load is imposed on the arm component 1. For example, the load line Y of the arm component 1 is a straight line that connects a fixed point at which the arm component 1 is fixed with a load point at which a load is imposed on the arm component 1 in the longitudinal direction of the arm component 1.

By forming underfill parts 11 in the arm component 1, it is possible to optimally reduce torsional rigidity of the arm component 1 while reducing the weight of the arm component 1. Further, by making the central axis O and the load line Y of the arm component 1 coincident with each other (i.e., aligned with each other), the arm component 1 becomes less likely to be buckled (less likely to be bent in an awkward direction). Therefore, it is possible to prevent the stress from being concentrated in the arm component 1. That is, it is possible to reduce the torsional rigidity of the arm component 1 and sustain the durability thereof at the same time.

Next, a method for setting (i.e., defining) underfill parts 11 to optimally reduce torsional rigidity in the first embodiment is described in detail. Under the assumption that the underfill parts 11 are formed in the arm component 1 so that the central axis O and the load line Y of the arm component 1 coincide with each other as described above, shapes of the underfill parts 11 are determined while taking the below-described matters into consideration.

For example, when the size of the cross-sectional shape of the underfill parts 11 is increased and the size of the cross-sectional shape of the arm component 1 is decreased, torsional rigidity of the arm component 1 decreases. Conversely, when the size of the cross-sectional shape of the underfill parts 11 is decreased and the size of the cross-sectional shape of the arm component 1 is increased, the torsional rigidity of the arm component 1 increases.

When the length of the underfill parts 11 in the axial direction of the arm component 1 is increased, the torsional rigidity of the arm component 1 decreases. Conversely, when the length of the underfill parts 11 in the axial direction of the arm component 1 is decreased, the torsional rigidity of the arm component 1 increases. Note that the length of the underfill parts 11 can be increased as long as the underfill parts 11 do not reach collar parts (which will be described later). This is because, for example, when the underfill parts 11 extend to the collar part, a stress tends to be concentrated on a place where the underfill parts 11 intersect (i.e., connect with) the collar part.

In view of the above-described matters, the underfill parts 11 are set (i.e., defined) in the arm component 1 so that the torsional rigidity of the arm component 1 has a predetermined value by which a torsional deformation occurs in the arm component 1 in a flexible and satisfactory manner, and so that the central axis O and the load line Y of the arm component 1 coincide with each other.

For example, as shown in FIG. 2, the underfill parts 11 may be formed near the center of the cylindrical arm component 1 so that the cross-sectional shape of the arm component 1 becomes a roughly X-shape. The underfill parts 11 may be formed so that their cross-sectional shapes become roughly symmetrical to each other. For example, when torsional rigidity of the arm component 1 having a hollow structure is defined as 100%, the torsional rigidity of the arm component 1 can be reduced to approximately 2% (1/50) by forming the underfill parts 11 as shown in FIG. 2

As shown in FIG. 2, the underfill parts 11 are formed so that the cross-sectional shape of the arm component 1 becomes a roughly X-shape, while securing the cross-sectional area necessary for the arm component. Further, since the central axis O and the load line Y of the arm component 1 coincide with each other (i.e., are aligned with each other), the arm component 1 has a structure with which the arm component 1 is less likely to be buckled. As a result, it is possible to optimally reduce the torsional rigidity of the arm component 1 so that a torsional deformation occurs in a flexible and satisfactory manner while securing a tensile strength and a compressive strength of the arm component 1.

Next, a method for manufacturing an arm component according to the first embodiment is described.

For example, an arm component 1 is integrally molded by a 3D (three-dimensional) printer. The 3D printer is an apparatus that forms (e.g., molds) a 3D (three-dimensional) arm component 1 by stacking its cross-sectional shapes one another through an adding process by using an additive manufacturing method or the like while using 3D data of the arm component 1 created on a computer as a design blueprint. In the 3D data of the arm component 1, underfill parts 11 are set (i.e., defined) in the arm component 1 so that the torsional rigidity of the formed arm component 1 has a predetermined value and the central axis O and the load line Y of the formed arm component 1 coincide with each other as described above.

The 3D printer drives its nozzle based on the 3D data of the arm component 1, and thereby discharges (e.g., spews out) a powder of metal, ceramic, nylon, or the like from the nozzle toward an area(s) corresponding to the cross-sectional shape of the arm component 1 and discharges (e.g., spews out) support material toward an area(s) other than the cross-sectional shape of the arm component 1, such an area(s) corresponding to the underfill parts 11. Then, the 3D printer drives a laser apparatus so that it applies high-power laser to the area(s) corresponding to the cross-sectional shape of the arm component 1 and thereby forms (e.g., molds) the cross-sectional shape in each layer. By repeating the above-described process, the 3D printer stacks the cross-sectional shape of each layer and thereby forms (e.g., molds) the 3D arm component 1. Lastly, the 3D printer removes the support material deposited in space inside the arm component 1 as well as the support material deposited around the arm component 1.

As described above, in the arm component 1 according to the first embodiment, at least one underfill part 11 is formed in the arm component 1 so that the central axis O of the arm component 1 coincides with (i.e., is aligned with) the load line Y of the arm component 1. By forming underfill parts 11 in the arm component 1, it is possible to optimally reduce torsional rigidity of the arm component 1 while reducing the weight of the arm component 1. Further, by making the central axis O and the load line Y of the arm component 1 coincident with each other, the arm component 1 becomes less likely to be buckled. Therefore, it is possible to prevent the stress from being concentrated in the arm component 1. That is, it is possible to reduce the torsional rigidity of the arm component 1 and sustain the durability thereof at the same time.

Second Embodiment

In the above-described first embodiment, the underfill parts 11 are formed near the center of the cylindrical arm component 1 so that the cross-sectional shape of the arm component 1 becomes a roughly X-shape. In a second embodiment, another form of underfill parts by which desired torsional rigidity of an arm component can be obtained and a central axis of the arm component coincides with a load line thereof is described.

Figure 3:
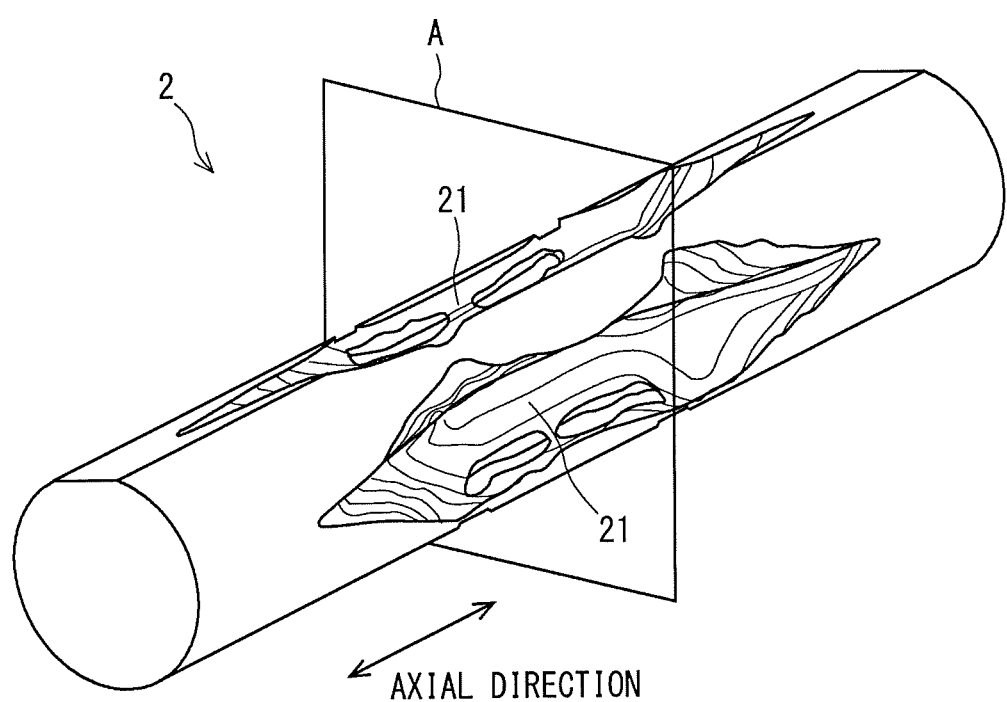
FIG. 3 shows an example of underfill parts that are formed so that a cross-sectional shape of an arm component becomes a roughly X-shape and a part of its cross-sectional shape is isolated from the other part thereof.
Figure 4:
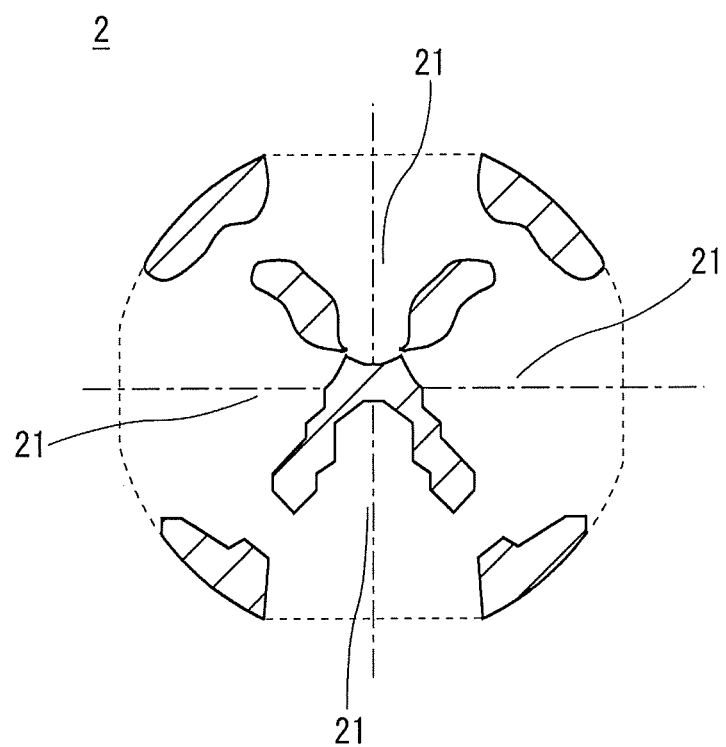
FIG. 4 is a cross section taken on a plane A in the arm component shown in FIG. 3.

FIG. 3 shows an example of underfill parts that are formed so that a cross-sectional shape of an arm component becomes a roughly X-shape and a part of its cross-sectional shape is isolated from the other part thereof from the other part thereof. FIG. 4 is a cross section taken on a plane A in the arm component shown in FIG. 3. As shown in FIG. 3, underfill parts 21 may be formed near the center of a cylindrical arm component 2 so that the cross-sectional shape of the arm component 2 becomes a roughly X-shape and a part of the cross-sectional shape is isolated from the other part thereof.

The cross-sectional area of the arm component 2 shown in FIG. 4 is smaller than that of the arm component 1 shown in FIG. 2 because of the aforementioned isolation on the cross section. As a result, the torsional rigidity of the arm component 2 shown in FIG. 4 is further reduced from that of the arm component 1 shown in FIG. 2. When torsional rigidity of an arm component having a hollow structure is defined as 100%, the torsional rigidity of the arm component 2 can be reduced to approximately 1% (1/100) by forming the underfill parts 21 as shown in FIG. 3.

Figure 5:
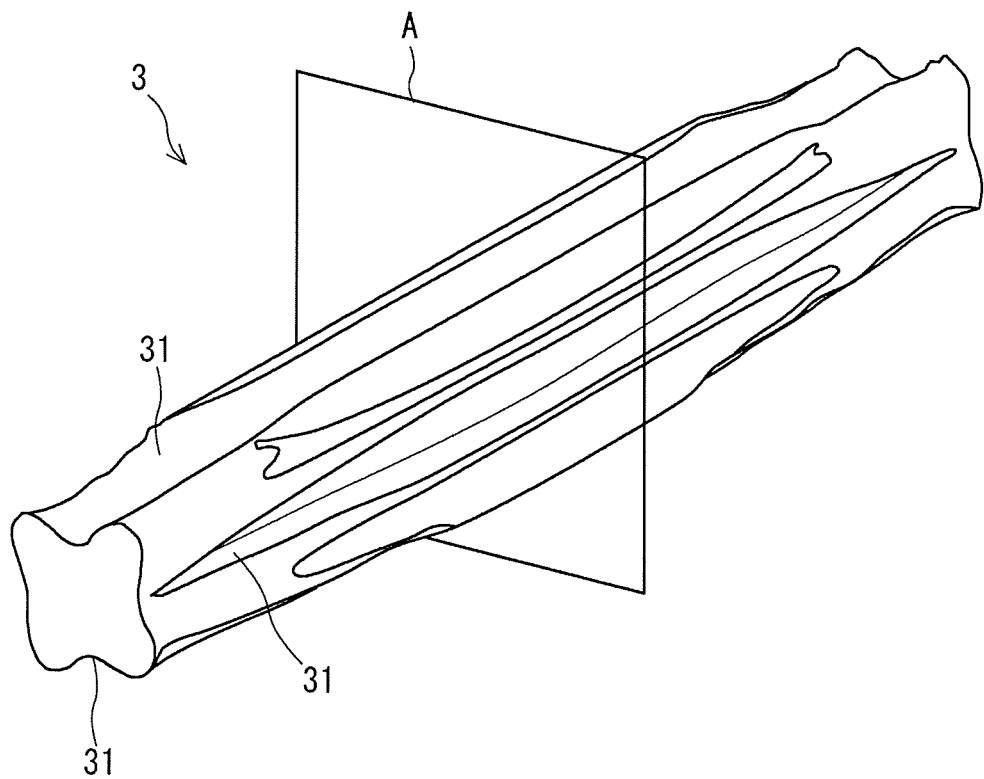
FIG. 5 shows an example of underfill parts that are formed so that a cross-sectional shape of an arm component becomes a roughly X-shape over the entire length in the axial direction.
Figure 6:
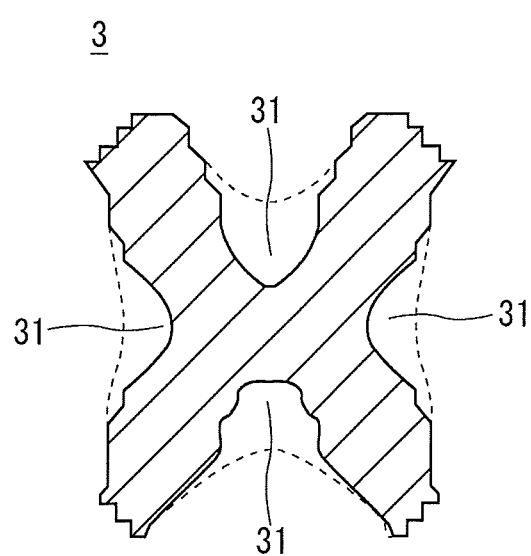
FIG. 6 is a cross section taken on a plane A in the arm component shown in FIG. 5.

FIG. 5 shows an example of underfill parts that are formed so that a cross-sectional shape of an arm component becomes a roughly X-shape over the entire length in the axial direction. FIG. 6 is a cross section taken on a plane A in the arm component shown in FIG. 5. As shown in FIG. 5, underfill parts 31 may be formed so that a cross-sectional shape of an arm component 3 becomes a roughly X-shape over the entire length in the axial direction.

The underfill parts 31 may be formed so that the cross-sectional area of the X-shape at the center of the arm component 3 in the axial direction becomes larger than that of the X-shape at both ends in the axial direction. When torsional rigidity of an arm component having a hollow structure is defined as 100%, the torsional rigidity of the arm component 3 can be reduced to approximately 10% (1/10) by forming the underfill parts 31 as shown in FIG. 5.

Figure 7:
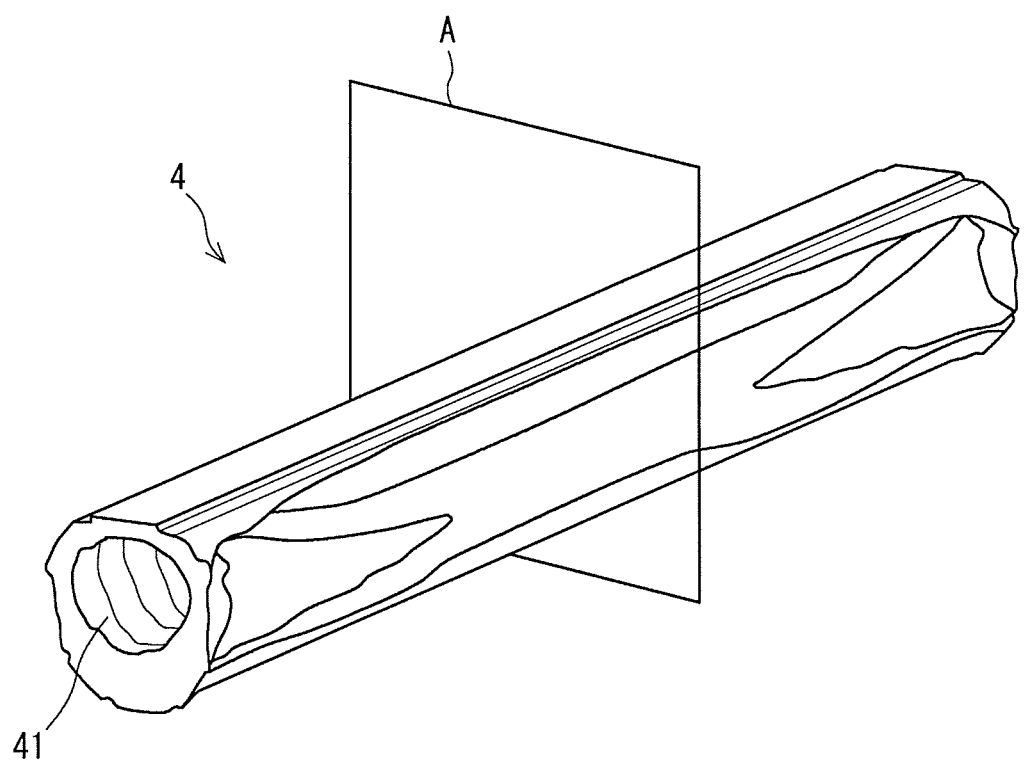
FIG. 7 shows an example of underfill parts that are formed so that a cross-sectional shape of an arm component becomes a roughly annular shape.
Figure 8:
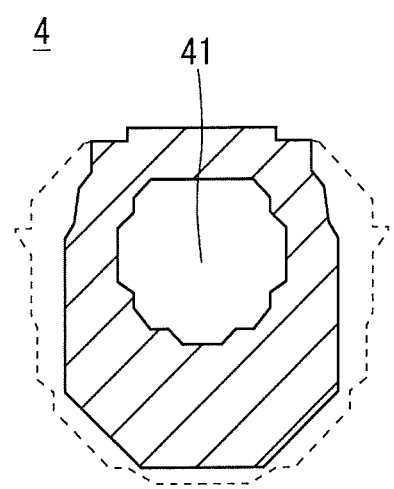
FIG. 8 is a cross section taken on a plane A in the arm component shown in FIG. 7.

FIG. 7 shows an example of underfill parts that are formed so that a cross-sectional shape of an arm component becomes a roughly annular shape. FIG. 8 is a cross section taken on a plane A in the arm component shown in FIG. 7. Underfill parts 41 of an arm component 4 may be formed so that a cross-sectional shape of the arm component 4 becomes a roughly annular shape. Further, an inner circle of the annular cross-sectional shape may be eccentric to an outer circle thereof. When torsional rigidity of an arm component having a hollow structure is defined as 100%, the torsional rigidity of the arm component 4 can be reduced to approximately 5% (1/20) by forming the underfill parts 41 as shown in FIG. 7.

Figure 9:
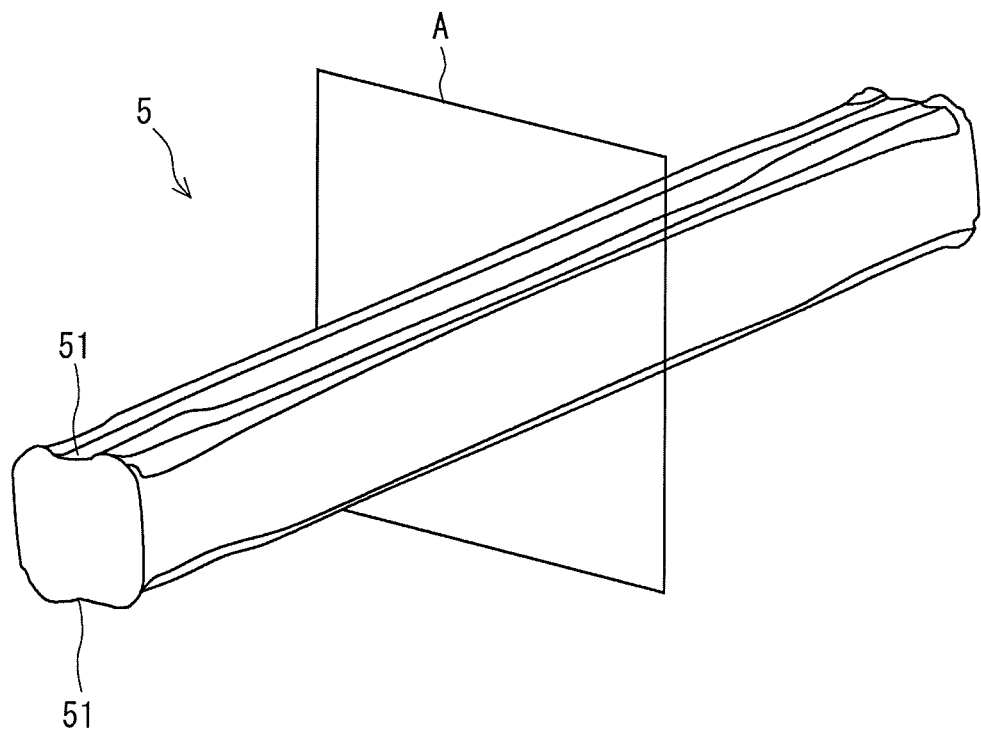
FIG. 9 shows an example of underfill parts that are formed so that a cross-sectional shape of an arm component becomes a roughly rectangular (or square) shape.
Figure 10:
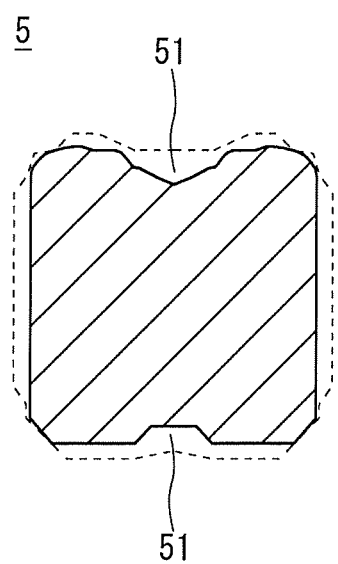
FIG. 10 is a cross section taken on a plane A in the arm component shown in FIG. 9.

FIG. 9 shows an example of underfill parts that are formed so that a cross-sectional shape of an arm component becomes a roughly rectangular (or square) shape. FIG. 10 is a cross section taken on a plane A in the arm component shown in FIG. 9. Underfill parts 51 of an arm component 5 may be formed so that a cross-sectional shape of the arm component 5 becomes a roughly rectangular (or square) shape. Further, the underfill parts 51 of the arm component 5 may be formed so that a part of each of the upper and lower sides of the rectangular cross-sectional shape has a concave shape. When torsional rigidity of an arm component having a hollow structure is defined as 100%, the torsional rigidity of the arm component 5 can be reduced to approximately 2.5% (1/40) by forming the underfill parts 51 as shown in FIG. 9.

Third Embodiment

Figure 11:
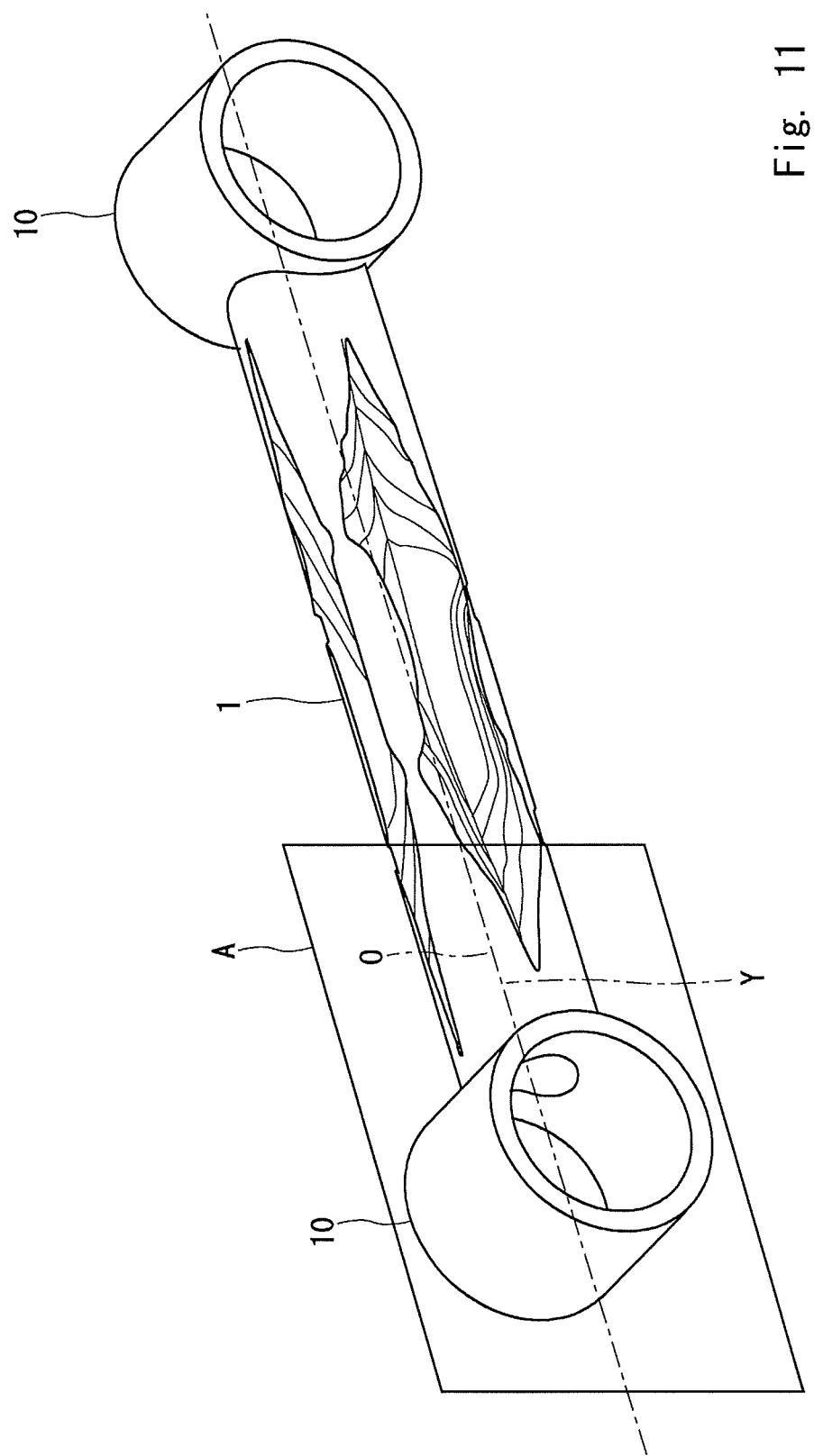
FIG. 11 is a perspective view of an arm component according to a third embodiment of the present disclosure.
Figure 12:
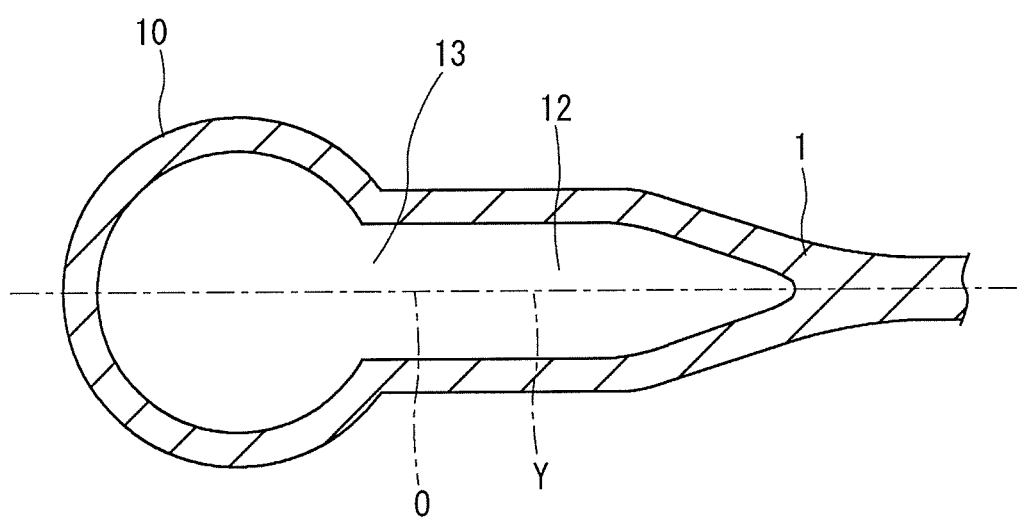
FIG. 12 is a cross section taken on a plane A in the arm component shown in FIG. 11.

FIG. 11 is a perspective view of an arm component according to a third embodiment of the present disclosure. FIG. 12 is a cross section taken on a plane A in the arm component shown in FIG. 11. For example, a cylindrical collar part 10 is formed at each end of an arm component 1 as shown in FIG. 11. The arm component 1 and both of the collars 10 are integrally molded by using, for example, a 3D printer.

A hollow part 12 with a hollow formed inside thereof is formed along the axial direction of the arm component 1 at each end of the arm component 1. Each of the hollow parts 12 is formed in such a manner that a hollow having a predetermined length is formed along the axial direction of the arm component 1 at the end of the arm component 1. By making the end of the arm component 1 hollow as described above, it is possible to reduce the weight of the arm component 1 and reduce the torsional rigidity of the arm component 1.

A communicating hole 13 that communicates between a space inside the collar part 10 and the hollow part 12 may be formed in a connecting part of the collar part 10 that connects with the end of the arm component 1. It is possible to pull out (i.e., remove) support material deposited inside the hollow part 12 through this communicating hole 13.

Further, the communicating hole 13 is formed so as to be centered on the central axis O, which connects centroids with one another. Therefore, the communicating hole 13 prevents the stress to be concentrated and thereby improves the durability of the arm component. That is, it is possible to increase the durability of the arm component 1 and reduce the weight thereof. Note that since the part where the end of the arm component 1 connects with the collar part 10 is deviated from the centroid, the strength and robustness of the arm component 1 can be ensured.

In the third embodiment, the same components/structures as those of the first embodiment are indicated by the same symbols as those of the first embodiment and their detailed descriptions are omitted.

Several embodiments according to the present disclosure have been explained above. However, these embodiments are shown as examples but are not shown to limit the scope of the disclosure. These novel embodiments can be implemented in various forms. Further, their components/structures may be omitted, replaced, or modified without departing from the scope and spirit of the disclosure. These embodiments and their modifications are included in the scope and the spirit of the disclosure, and included in the scope equivalent to the disclosure specified in the claims.

In the above-described embodiments, the arm component 1 is applied to (i.e., used as) a suspension arm. However, the application of the arm component 1 is not limited to the suspension arm. The arm component 1 may be applied to, for example, a torque rod of an engine or the like. That is, the arm component 1 may be applied to any type of a rod-shaped arm to which a torque is applied (or exerted).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a rod-shaped arm component, the method comprising:

forming at least one underfill part in the arm component so that a central axis of the arm component coincides with a load line of the arm component, the central axis of the arm component being a line connecting centroids of cross-sectional shapes with one another in an axial direction of the arm component, the cross-sectional shapes being shapes on cross-sectional planes perpendicular to an axis of the arm component, the load line of the arm component indicating a line on which a load is imposed in the arm component, wherein the underfill part does not reach each end of the rod-shaped arm component, a cylindrical collar part is integrally formed at an end of the arm component, a hollow part with a hollow formed inside thereof is formed along the axial direction of the arm component at the end of the arm component, a communicating hole communicating between a space inside the collar part and the hollow part is formed in a connecting part of the collar part, the connecting part of the collar part connecting with the end of the arm component, the communicating hole is formed so as to be centered on the central axis of the arm component, the arm component is integrally formed by a 3D (three-dimensional) printer, and a support material deposited inside the hollow part is pulled out through the communicating hole.

2. The method according to claim 1, wherein the underfill part is formed in the arm component so that torsional rigidity of the arm component has a predetermined value and the central axis of the arm component coincides with the load line of the arm component.

3. The method according to claim 1, wherein the underfill part is formed so that the cross-sectional shape of the arm component becomes an X-shape.

* * * * *